United States Patent
Enyedy et al.

(10) Patent No.: US 9,649,714 B2
(45) Date of Patent: May 16, 2017

(54) MODULAR WELDING SYSTEM

(71) Applicant: Lincoln Global, Inc., City of Industry, CA (US)

(72) Inventors: Edward A. Enyedy, Eastlake, OH (US); Michael A. Kindig, Chagrin Falls, OH (US); Jason Leach, Cleveland, OH (US); Robert J. Thayer, Lakewood, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 604 days.

(21) Appl. No.: 13/826,641

(22) Filed: Mar. 14, 2013

(65) Prior Publication Data

US 2013/0292366 A1 Nov. 7, 2013

Related U.S. Application Data

(60) Provisional application No. 61/641,376, filed on May 2, 2012.

(51) Int. Cl.
  *B23K 9/12* (2006.01)
  *B23P 19/00* (2006.01)
  *B23K 9/133* (2006.01)
  *B23K 9/173* (2006.01)
  *B23K 9/32* (2006.01)

(52) U.S. Cl.
  CPC .............. *B23K 9/124* (2013.01); *B23K 9/125* (2013.01); *B23K 9/133* (2013.01); *B23K 9/173* (2013.01); *B23K 9/32* (2013.01); *B23P 19/00* (2013.01); *Y10T 29/49826* (2015.01)

(58) Field of Classification Search
  CPC ........ B23K 9/1336; B23K 9/32; B23K 9/124; B23K 9/1333; B23K 9/173; B23K 9/125; B23K 9/133
  See application file for complete search history.

(56) References Cited

U.S. PATENT DOCUMENTS

| 3,940,586 A * | 2/1976 | Stearns et al. ................. 219/75 |
| 2005/0224482 A1 | 10/2005 | Matiash |
| 2011/0220630 A1 | 9/2011 | Speilman et al. |

FOREIGN PATENT DOCUMENTS

| GB | 812237 A | 4/1959 |
| JP | 09103881 A | 4/1997 |

OTHER PUBLICATIONS

International Search Report and Written Opinion for corresponding application PCT/IB2013/000816, dated Oct. 1, 2013.

* cited by examiner

*Primary Examiner* — David Angwin
*Assistant Examiner* — Amit K Singh
(74) *Attorney, Agent, or Firm* — Brad C. Spencer

(57) ABSTRACT

A modular welding system which can switch between right-handed and left-handed wire feeders by use of the modular design and without having a duplicative dual feed system is disclosed. This aspect is applicable to robotic welding as well as boom-mounted welding operations.

16 Claims, 9 Drawing Sheets

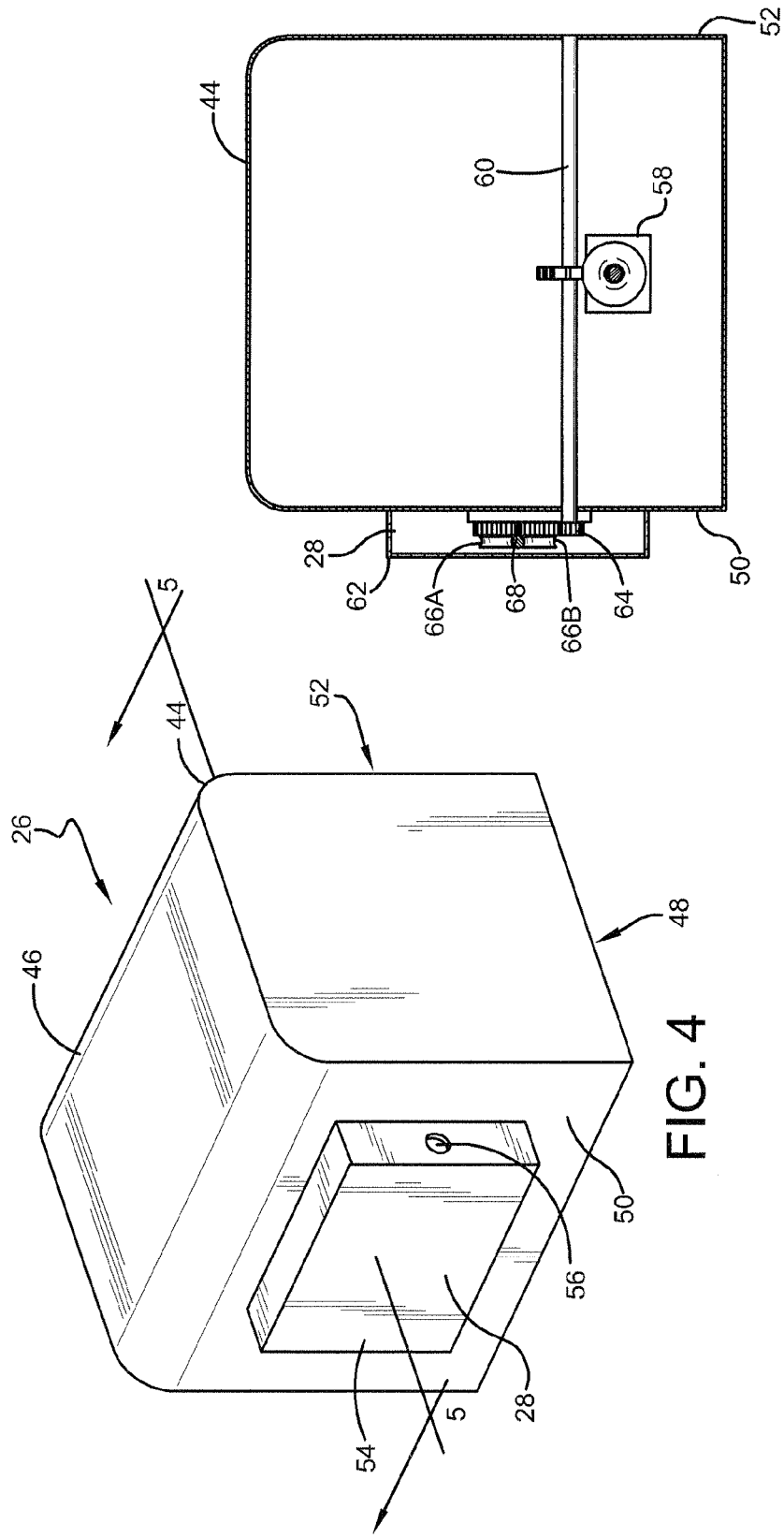

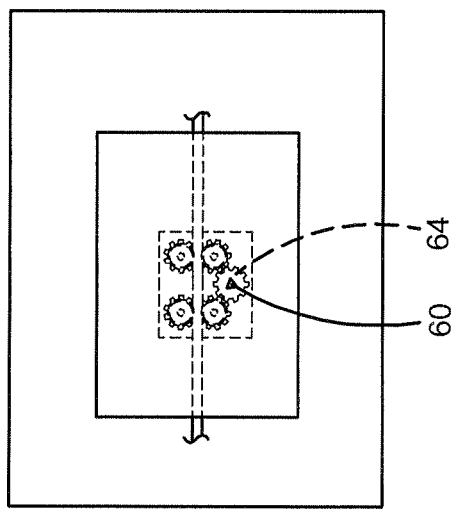
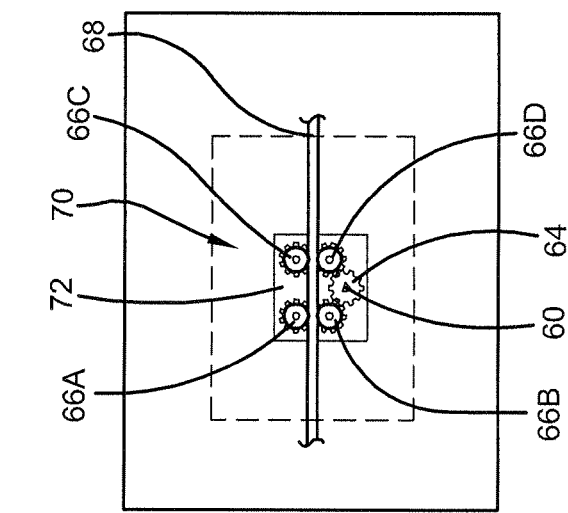
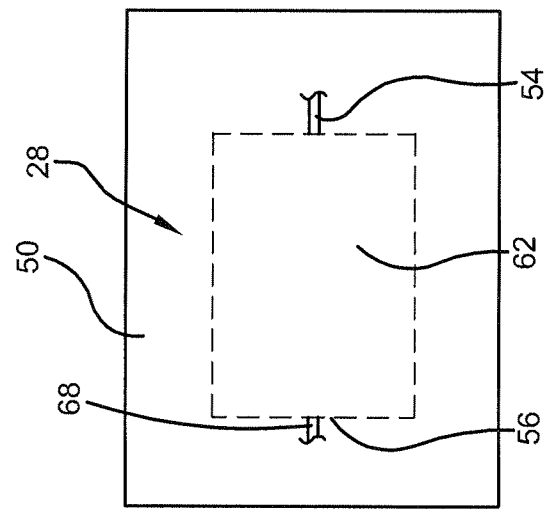
FIG. 6C
FIG. 6B
FIG. 6A

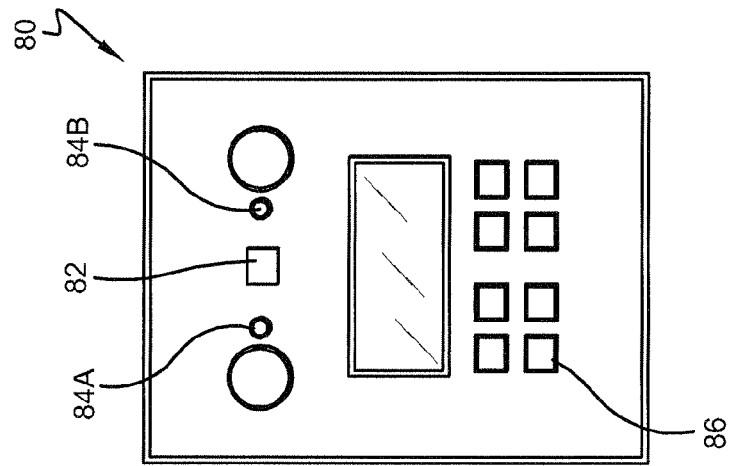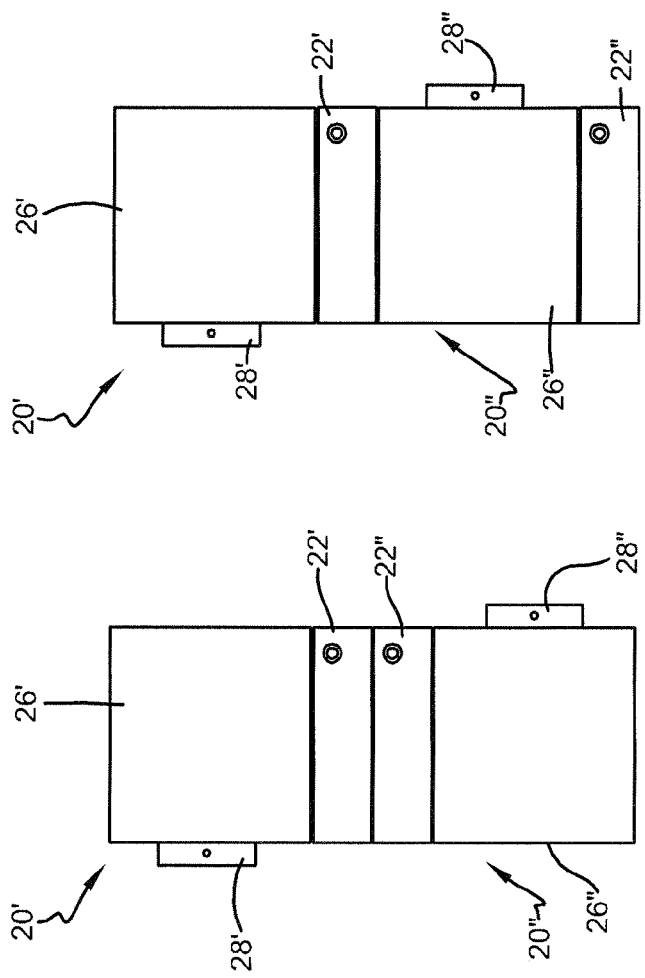

MODULAR WELDING SYSTEM

CROSS-REFERENCE TO RELATED APPLICATIONS

This application claims priority to and fully incorporates by reference, U.S. Provisional Patent Application Ser. No. 61/641,376 filed on 2 May 2012.

TECHNICAL FIELD

This invention relates to a modular welding system which can be used with both left-handed and right-handed wire drive motor assemblies.

BACKGROUND OF THE INVENTION

Welding, such as gas metal arc welding, requires a continuous feed of metal wire to the welding tip, torch, nozzle, or gun, for use in the welding process. Wire feeders generally include a reel stand for holding a reel of wire and a wire drive module that draws wire from the reel and supplies it to the welding tip.

Wire feeders are provided as single and double header wire feeders, and additionally are typically available in both bench and boom mounted versions. In addition to the wire feeder, a welding system generally also includes welding gun connections, inlet gas connector (if necessary) with associated torch connector as well as a user interface with various required and optional control systems and interconnections. The wire feeder is often secured to the welding unit. With a single header wire feeder, wire from the wire feeder reel stand is routed to the welding unit according to the location of the wire drive system, i.e., on the left-hand side or right-hand side depending on the location of the drive motor. In a dual header wire drive, both wire reels and wire drive motors are positioned on both sides of the welding unit. While this obviates the left-handedness or right-handedness of the unit, it effectively increases both the size and cost of the unit.

With single header wire feeders, one possible solution to switching from a right-handed drive motor to a left-handed drive motor would be to simply rotate the entire wire drive and any associated controllers. However, this solution is not ideal because of cable routing and physical workspace limitation issues; for example the user interface may be in a position where it cannot be adjusted.

With dual header wire feeders, this solution requires maintaining additional, if substantially identical, product lines, manufacturing additional components, and requiring additional overhead to warehouse and shelve these products.

Therefore, there is a recognized need for a reversible wire feeder that may be interchangeably configurable to be used with a left-handed or right-handed wire feeder.

There is therefore recognized a need in the art for a wire feed unit that may be configured to provide dual wire feeding in a small footprint, or may be configured to provide either single or dual wire feeding with a single unit.

SUMMARY OF THE INVENTION

In accordance with the present invention, there is provided a modular welding system which includes at least the following: at least one controller module, each of the at least one controller modules comprising at least one gas inlet connector and at least one welding control cable connector; at least one user interface module operatively connected to the at least one controller module; at least one separable wire drive module positionable from a first position to a second position, each of the separable wire drive modules comprising a feed module, the wire drive module connected to and in operative communication with the at least one controller module such that repositioning the wire drive module from the first position to the second position maintains the at least the at least one gas inlet connector, the at least one welding control cable connector and optionally the at least one user interface connector, on the same plane; and at least one wire feed means, which in one embodiment is a reel stand for supporting a reel of wire and providing the wire to the wire feeder, while in another embodiment is a welding wire box through which welding wire exits through an opening in the box; wherein the wire drive module is configurable to feed wire in either a first position or a second position.

In one aspect of the invention, the at least one separable wire drive module is positionable from the first position to the second position by rotation of the wire drive module about a central longitudinal axis of the wire drive module which is parallel to a wire feed axis.

In another aspect of the invention, the at least one separable wire drive module is positionable from the first position to the second position by rotation of the wire drive module about a central vertical axis of the wire drive module which is normal to a wire feed axis.

In yet another aspect of the invention, the at least one wire drive module further includes first and second connectors for selectively engaging the controller module upon rotation of the wire drive module.

The invention is not limited to a single welding system, but includes systems which have two welding systems in which there is at least two controller modules, at least two separable wire drive modules, each module having one wire drive positionable from a first position to a second position, each of the separable wire drive modules including a feed module, the wire drive module connected to and in operative communication with at least one controller module (optionally two controller modules) such that repositioning the wire drive module from the first position to the second position maintains the position of at least some of the connectors affixed to the controller modules in the same plane or surface.

The invention also includes a method for changing a wire feeder in a welding system from at least one welding wire drive which is positioned on one side of the wire feeder to an opposed side of the wire feeder including the following steps (without regard to order): providing at least one modular wire feeder having a controller module, at least one separable and repositionable wire drive module having a wire feeder, at least one user interface module, and a wire reel stand, the controller module, the wire drive module and the user interface module in operative connectivity; removing the welding wire drive from one side of the at least one wire feeder module to the opposed side of the wire feeder without repositioning any of the operative connectivity; positioning the at least one wire reel stand to match one of the wire feeder modules; reattaching the wire drive module to the opposed side of the at least one wire feeder without repositioning any of the operative connectivity; and controllably feeding wire from a reel of welding wire on the at least one wire reel stand through the wire feeder.

The method also encompasses the step of providing at least two modular wire feeders and also where the step of providing at least two modular wire feeders includes a first wire feeder which is positioned in a right-hand arrangement and a second wire feeder which is positioned in a left-hand arrangement.

The step of selecting a first or second position for a modular wire feeder includes the use of a switch on the user interface module for interface with the first wire feeder or the second wire feeder, the employment of which selectively engages to control one of the first or second wire feeders.

In still another aspect of the invention, a modular welding system is disclosed for use with a wire feeder for left- or right-hand wire feed, which includes: a controller module comprising at least a power connector and a gas inlet at one end of the controller module; a user interface module operatively connected to the controller module, the user interface module positioned at an opposed end of the controller module; a separable and repositionable wire drive module operatively connected to the controller module, the wire drive module further including a positionable wire feeder; a means for using either a left-handed or right-hand wire drive module without repositioning of the user interface module or the controller module. As before, the separable wire drive module is positionable (a) from a first position to a second position by rotation of the wire drive module about a central longitudinal axis of the wire drive module which is parallel to a wire feed axis or (b) from a first position to a second position by rotation of the wire drive module about a central vertical axis of the wire drive module which is normal to a wire feed axis.

The modular welding system further optionally includes a means for detecting if the wire feeder is in a left-hand or right-hand arrangement.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 4 is a perspective view of a left-handed wire feed module shown in FIG. 2;

FIG. 5 is a cutaway view of a wire drive module taken along line 5-5 in FIG. 2;

FIG. 6A is a side view of the wire drive module illustrated in FIG. 3;

FIG. 6B is a side view of the wire drive module of FIG. 6A with the feed cover removed;

FIG. 6C is a side view of the wire drive module of FIG. 6A illustrating the drive shaft;

FIG. 9A is a front plan view of multiple wire feeders in which the control modules are interposed between the wire drive modules positioned both above and below;

FIG. 9B is a front plan view of multiple wire feeders in which the control modules are positioned below each wire drive modules; and FIG. 10 is a plan view of a user control interface.

DETAILED DESCRIPTION OF THE INVENTION

Figure 1A:
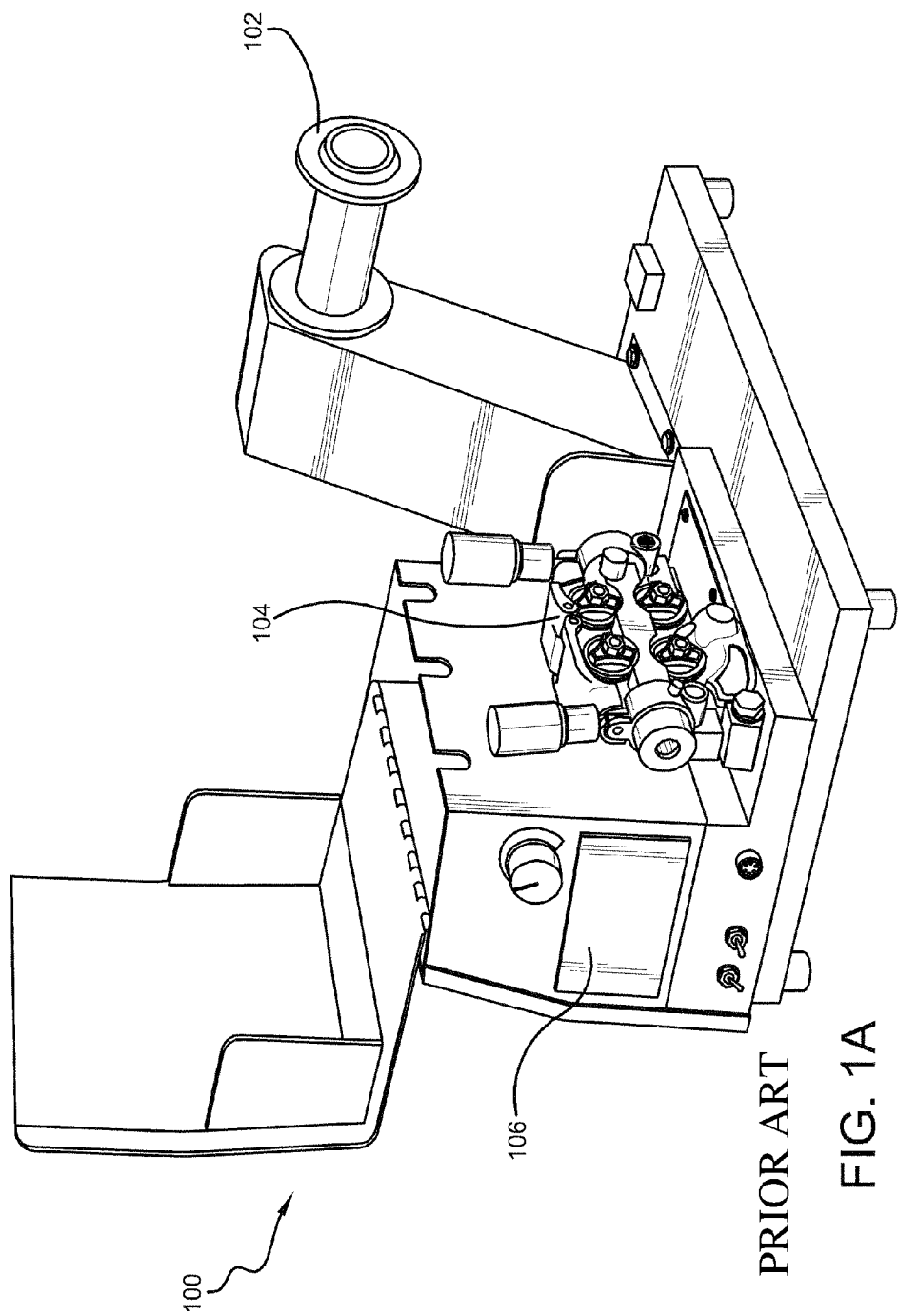
FIG. 1a is a front perspective view of a prior art right-handed welding wire feed system with spindle, associated wire drive system and user interface.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1A illustrates a prior art right-handed drive motor welding wire feed system 100 with welding wire spindle 102, associated wire drive system 104 and user interface 106. While a welding wire spindle is illustrated in the Figure, there is no need to limit the invention to the same, and welding wire feeding means would include welding wire sourced from a box.

Figure 1B:
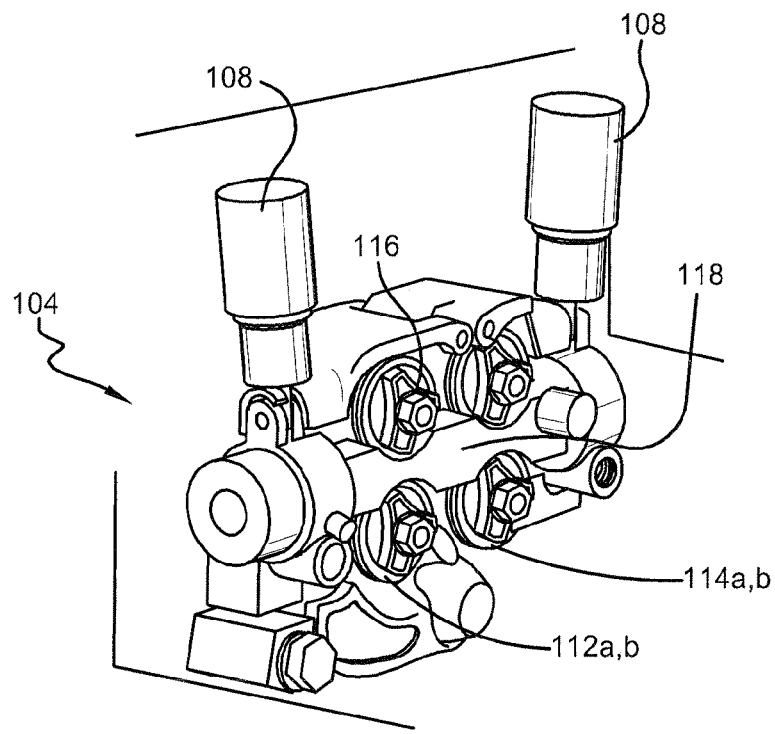
FIG. 1b is a side perspective view of a prior art four roll drive right-handed welding wire feed drive system.
Figure 1C:
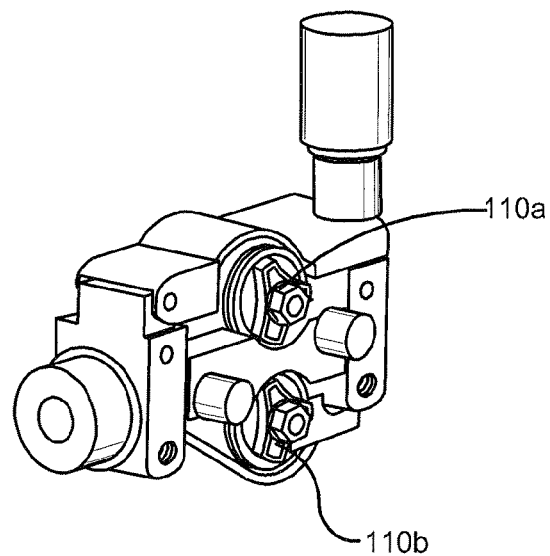
FIG. 1c is a side perspective of a prior art two roll drive right-handed welding wire feed drive system.

As better illustrated in FIGS. 1B & 1C, wire drive systems are available with a two roll drive, see FIG. 1C, and a four roll drive, see FIG. 1B. As illustrated with this particular wire drive system 104, the system includes at least one tensioner 108 to set the tension upon the welding wire and either a pair of drive rolls 110a, 110b, better illustrated in FIG. 1C or two pairs of drive rolls, 112a, 112b and 114a, 114b better illustrated in FIG. 1B. Fastening hub 116 is affixed to the protruding axle of the drive wheels for securing engagement. In an optional aspect of the invention, split wire guide 118 is positioned between the drive wheels for full welding wire support throughout the drive path.

Figure 2:
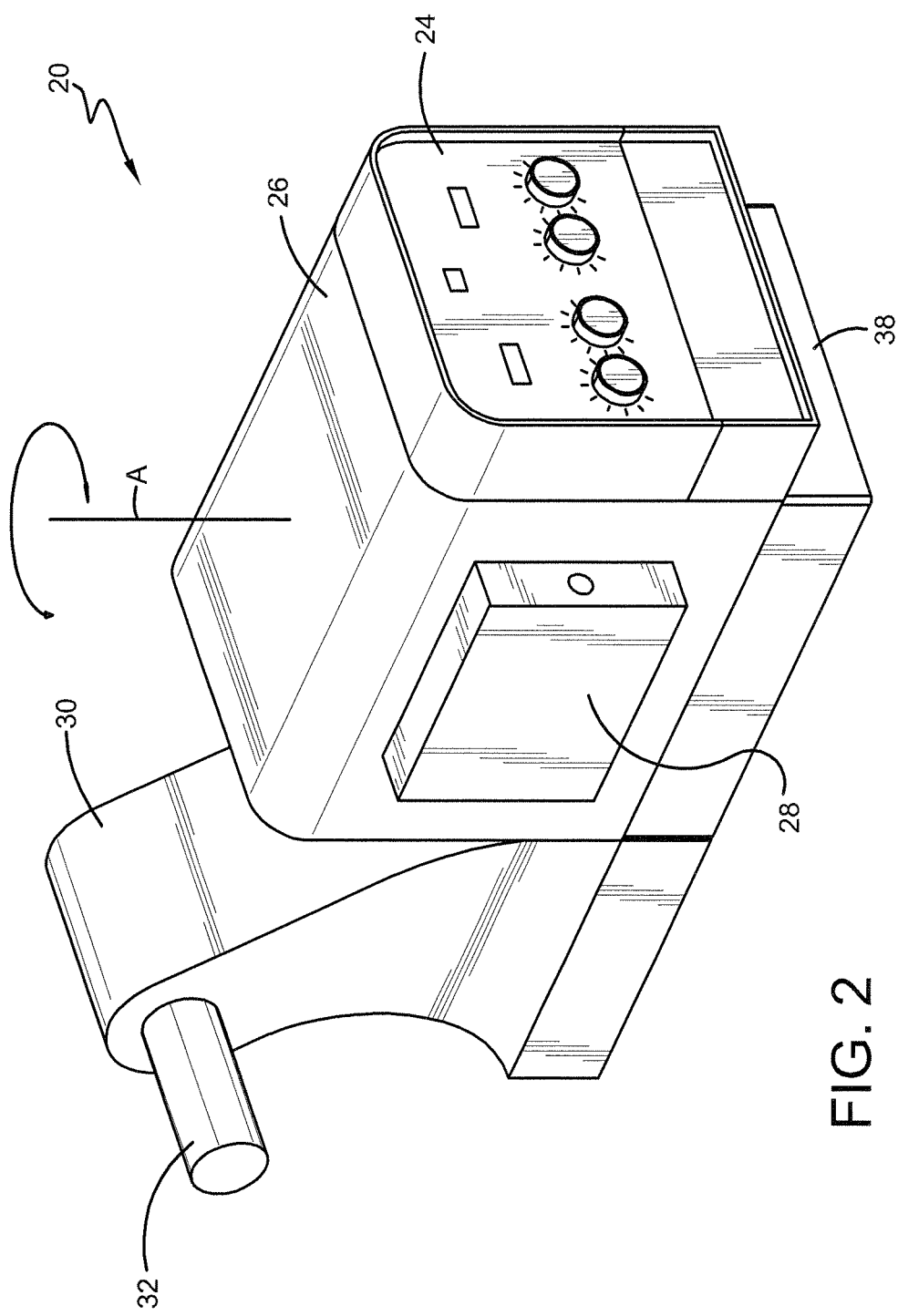
FIG. 2 is an exploded view of a left-handed modular wire feeder.

As shown in FIG. 2, modular wire feeder 20 includes controller module (illustrated as positioned within base 22, although the module could be positioned within modular wire feeder 26 or user interface module 24), user interface module 24, wire drive module 26 with left-handed wire feeder 28 as well as welding wire reel stand 30 with spindle 32. Appropriate modules are connected to one another, mechanically and/or electrically, providing communication therebetween, the electronic connection including wireless transmission.

Figure 3:
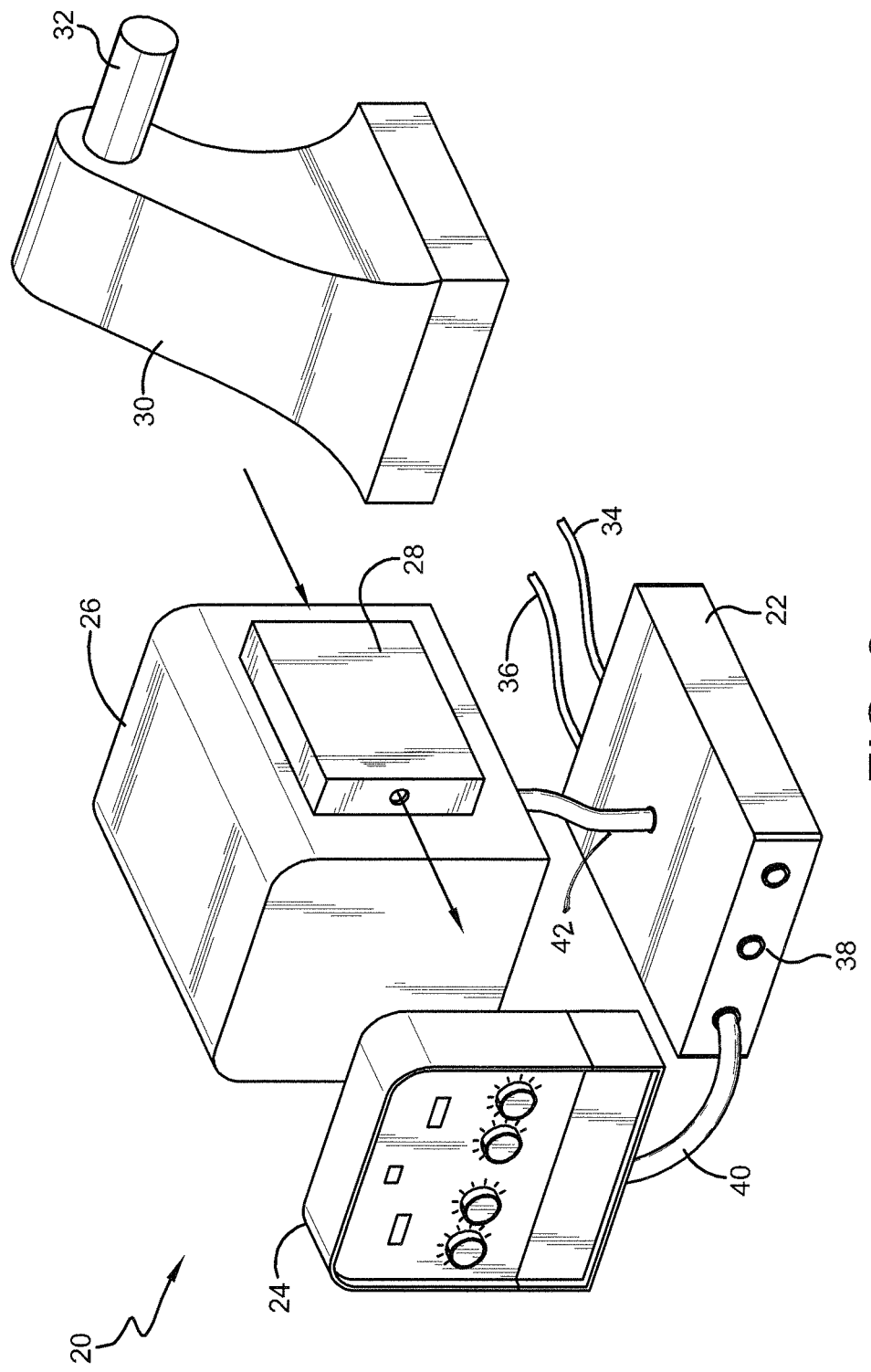
FIG. 3 is an exploded view of a right-handed modular wire feeder similar to that illustrated in FIG. 1.

As better illustrated in FIG. 3, controller module 22 includes power cable 34 and optionally, gas line 36 providing shielding gas for the welding operation. When appropriate, control module 22 includes interface 38 for connecting to and utilizing the shield gas and power, for example to a separate or integral welding unit.

User interface module 24 is operatively connected to controller module 22 by means of user interface cable 40, recognizing that wireless connectivity is within the scope of this invention. User interface cable 40 receives input from user interface module 24 and electronically communicates appropriate information to control module 22, which in turn, communicates appropriate information to wire drive module 26 or other components. Control module 22 communicates with user module 24 through interface cable 40, providing power, gas flow information, or other data useful in the welding process. User interface module 24 optionally includes dials, displays, or other control or display elements as known in the art.

As illustrated in FIG. 3, wire drive module 26 is connected to controller module 22 by means of wire drive cable 42 which communicates information between controller module 22 and wire drive module 26, the information including, but not limited to, the rate of wire transfer, size of wire, wire tension and other information.

As illustrated in more detail in FIG. 4, the basic configuration of wire drive module 26 includes housing 44 and wire feeder 28. As illustrated in the figure, housing 44 is generally rectangular, having opposed top 46 and bottom 48 as well as opposed left 50 and right 52 sides. These designations are intended to be illustrative rather than limiting, and not intended to convey a specific arrangement or position of wire drive module 26. As will become apparent from the following description and drawings, wire drive module 26 is positionable in several different arrangements.

As further shown in FIGS. 4 & 6A, wire feeder 28 includes wire receiving end 54 and wire exiting end 56, often, but not necessarily, a circular aperture. Wire from the reel positioned onto spindle 32 of wire reel stand 30 is received in receiving end 54 of feeder 28, straightened, and fed through the wire exiting end 56 at a rate communicated to wire drive module 26 by controller module 22 as set by the user at user-interface 24. It should be noted that spindle 32 is positionable on either side of wire reel stand 30 as illustrated in a comparison of FIG. 2 and FIG. 3 illustrates.

FIG. 5 is a cutaway view showing the internal arrangement of wire drive module 26. In this figure, housing 44 contains drive motor 58 that rotates drive shaft 60 by means of a series of gears, a worm gear, belt, or other configuration known in the art. Drive motor 58 is shown as being perpendicular to drive shaft 60, although it should be recognized that the drive motor is be of any arrangement including parallel, perpendicular, or angled relative to drive shaft 60. As illustrated, the drive shaft extends between opposed left 50 and right 52 sides of housing 44.

In the arrangement shown in FIG. 4, wire feeder 28 has been positioned on the left 50 side of housing 50. The wire feeder as shown includes feeder cover 62, drive shaft engagement gear 64, drive rolls 66A-B, and wire feed path 68 through which wire is capable of being fed.

FIGS. 6A-C show a side view of wire drive module 26 and wire feed module 28 in various stages of disassembly. In FIG. 6A, wire feed module 28 is shown with cover 62 in place. Welding wire 68 enters feed module 28 at receiving end 54 and exits feed module 28 at wire exiting end 56.

In FIG. 6B, cover 62 has been removed, showing drive system 70 and welding wire 68 passing through the system. Drive system 70 includes drive shaft engagement gear 64 that is coupled to drive shaft 60. As shown, drive shaft 60 includes a keyed or shaped end that enables rotational movement to be transmitted to drive shaft engagement gear 64. In FIG. 5B, drive shaft 60 is shown with a triangular cross-section, however it will be apparent that a variety of arrangements including square, hexagonal, keyed, or other arrangements are contemplated.

As illustrated in the figure, drive system 70 include feed plate 72 onto which a number of drive rolls 66A-D are rotatably mounted. These drive rolls serve various purposes, including straightening, feeding, aligning, and regulating wire 68 as it is fed through feed module 28. The drive rolls are driven by the drive shaft engagement gear 64, and therefore feeds or retracts the wire as required.

FIG. 6C shows a side view of wire drive module 26 with wire feeder 28 removed. Visible in this view is drive shaft 60. As illustrated in this figure, drive shaft 60 is accessible from either side of drive module 26. This allows wire feeder 28 to be installed to either left- 50 or right-hand side 52 of drive module 26. Drive shaft 60 engages drive shaft engagement gear 64 by protruding slightly from the sides of the housing or drive shaft engagement gear 64 extends into housing 44 to engage drive shaft 60. Alternatively, wire drive module 26 is manufactured as described above and housing 44 is constructed so that only one end of drive shaft 60 is exposed, thereby preventing contamination of the internal components of drive shaft 60.

It will be apparent that the above-described apparatus allows for a modular wire drive system. The wire drive system allows for a user to select either a left- or right-hand feed and change from one system to another without additional cost, parts, or product lines.

Figure 7:
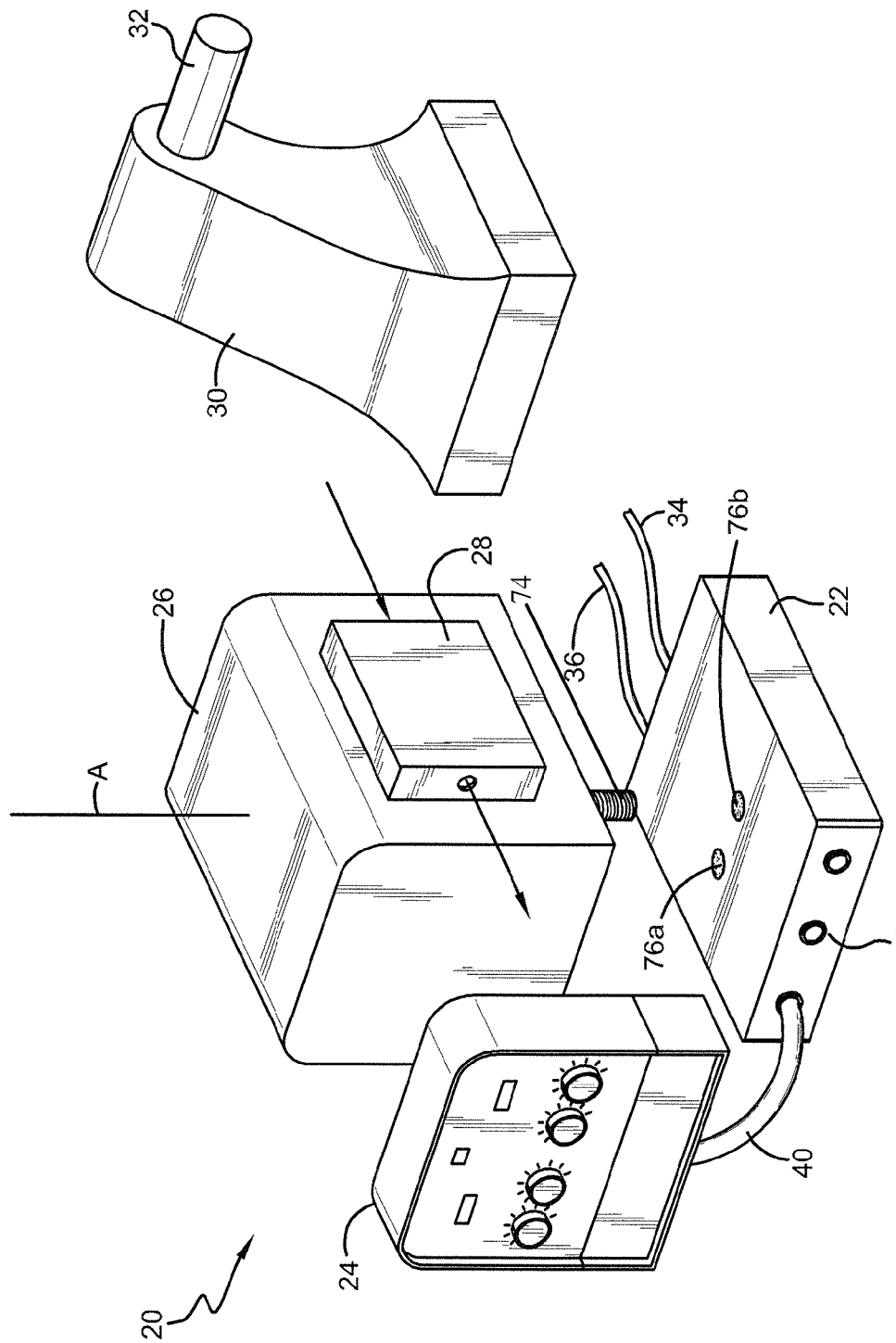
FIG. 7 is an exploded perspective view of the modular wire feeder illustrating plug-in capability.

As illustrated in FIG. 7, wire drive module 26 is rotatable (either by fixed increments or by free rotation), but preferably at least by 180° about an axis A to present either a left- or right-handed wire feed. Wire drive module 26 is connected to controller module 22 through connector 74, such as a 19-pin control cable connection (or other control cable with different numbers of pins or orientations or communication protocol dictated by other electrical considerations), or by means of a cable (better illustrated in FIG. 1) between wire drive module 26 and controller module 22. If a direct connection is preferred, connector 74 is keyed so as to indicate to the controller module whether wire drive module 26 is in a left- or right-hand arrangement. One implementation of this arrangement includes connector 74 offset from the center as shown by ports 76A, 76B in wire drive controller module 22 depending on the arrangement. For example, in a left-hand feed arrangement connector 74 engages first port 76A; and in a right-hand feed arrangement connector 74 engages second port 76B. The engagement of first or second ports 76A, 76B communicate pertinent information to wire drive controller module 22, e.g., the arrangement of the wire drive module.

In this aspect, when wire drive module 26 is switched between the left- and right-hand feed arrangements, wire feeder 28 will generally not have cover 28 positioned thereupon, but will have a more mirror image front and rear components to the housing so that wire properly enters receiving end 54 and exits wire exiting end 56 of the wire feeder. As illustrated, wire feeder 28 is rotatable about drive axis 60 allowing receiving end 54 of the wire feeder to be positioned toward wire reel stand 30.

Figure 8:
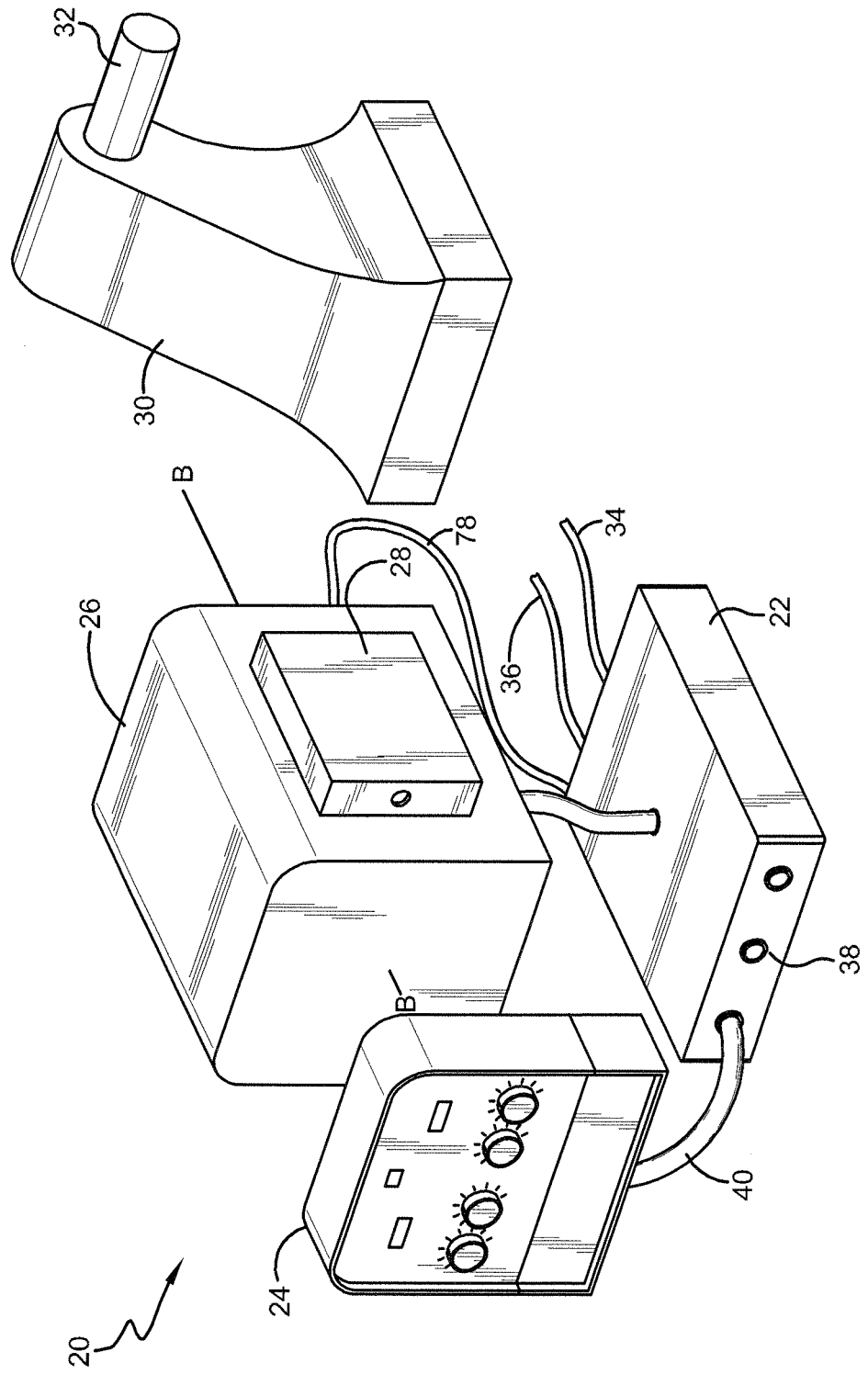
FIG. 8 is an exploded perspective view of the wire feeder.

As illustrated in FIG. 8, wire drive module 26 is rotatable about an axis B-B. Positioning wire feeder 28 on either the left- or right-hand side without requiring adjustment of the wire feeder. According to this arrangement, wire drive module 26 includes cable 78 extending from the rear of module 26 that connects to controller module 22. When wire drive module 26 is rotated about axis B-B, cable 78 does not need to be adjusted to accommodate this adjustment.

As shown in FIGS. 9A & 9B, multiple modular wire feeders 20', 20" are illustrated adjacent to one another, thereby allowing two welders to be operated simultaneously. Unlike current generation wire feeders, these are stackable on top of one another as shown or positionable in a side-by-side arrangement. The feeders 20', 20" are positioned with corresponding control modules 22', 22" adjacent to one another (FIG. 9A) or separated from one another (FIG. 9B) as desired.

An advantage when using multiple modular wire feeders 20', 20" is the ability to use dual-mode user interface module 80 for controlling two (or more) feeders as shown in FIG. 10. As illustrated in the figure, dual-mode user interface module 80 is provided with selector 82 which embodies various forms, e.g., a switch, button, lever, or other device and indicator lights 84A, 84B indicating whether the first- or second-feeder 20', 20" is being controlled. Additional remaining controls 86, include controls for voltage, wire feed speed, gas flow rate, and other parameters are substantially identical to those provided for a single feed control module 24 (FIGS. 2 & 3). An operator selects the desired parameters for first wire feeder 20', then press the selector 82 and control the parameters for second wire feeder 20". Indicator lights 84A, 84B are provided to indicate to the user which system is being controlled.

Also disclosed is a novel method of using a modular wire feeder as shown in the appropriate figures. According to this method modular wire feeder 20 is provided having control module 22, user interface module 24, wire drive module 26 having a wire feeder 28, and wire reel stand 30 having spindle 32. Either a left- or right-hand wire feed arrangement is selected according to the needs of the user by repositioning spindle 32 to the appropriate side of wire reel stand 30. Wire reel stand 30 is arranged so that spindle 32 is arranged in a left- or right-hand feed arrangement and wire drive module 26 is positioned in the same arrangement.

According to one option in the method, wire feeder 28 is removed from one side of wire drive module 26 and reaffixed to its opposed side. Further according to this embodiment, wire drive module 26 includes drive shaft 60 driven by drive motor 58. Drive shaft 60 extends between the left and right sides of wire drive module 26 and wire feeder 28 engages drive shaft 60 from the appropriate side. Drive shaft 60 preferably includes a shaped end, such as a hexagonal, triangular, keyed or other shape for engaging drive shaft engagement gear 64 of wire feeder 28. It is however, recognized that a shaped end is not an absolute requirement of the invention and other methodologies of fixing the shaft are within the scope of the invention, e.g., use of a set screw or a "C-shaped" shaft.

According to another option in the method, wire feeder 28 is reversible, rotatable, or reconfigurable (for example by switching input and output bearings). Wire drive module 26 is rotatable about an axis A-A, allowing the feeder to be positioned upon either side of control module 22. With this option, wire drive module 26 includes connector 74 and ports 76A, 76B on control module 22. When the wire feed module is in a first configuration (e.g., left-hand feed), connector 74 engages a first port 76A while in a second configuration connector 74 engages second port 76B. Control module 22 optionally automatically detects which port 76A or 76B is engaged and therefore will know whether wire drive module 26 is in the left- or right-hand feed arrangement.

According to yet another option in the method, wire drive module 26 is rotatable about an axis B-B. Wire drive module 26 includes cable 78 positioned in one instance on the back of wire drive module 26 so that the relative position of the cable 78—module 26 interface is not changed when drive module 26 is rotated.

When multiple modular wire feeders 20', 20" are employed, for example in a stacked or side-by-side arrangement, the modules are stackable so that either a left- or right-handed wire feeder is positioned above or below. Once wire feeder 20 (or feeders 20', 20") has been selected and arranged, control module 22 is connected to user interface module 24. This connection may be by a direct connection, cable connection, or wireless connection. User interface module 80 typically includes means for controlling two or more wire feeder units 20', 20". User interface module 80 includes selector switch 82, two or more indicator lights 84A, 84B, and controls 86 similar to those for user interface module 24 controlling a single feeder. In this arrangement, the method for operating multiple wire control modules includes the step of engaging selector 82 to select wire control module 20', configuring wire control module 20', and selecting another wire control module 20" by means of selector 82. This allows for multiple wire feed modules to be provided and controlled from a single user interface module.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A modular welding system for feeding a welding wire to a welding tip, the modular welding system comprising:
    at least one controller module, each of said at least one controller modules comprising
        a housing;
        at least one gas inlet connector connected to the housing; and
        at least one welding control cable connector connected to the housing;
    at least one user interface module having a housing operatively connected to said housing of said at least one controller module, said at least one user interface module receiving input from a user and sending commands to said at least one controller module based on said input from said user;
    at least one separable wire drive module having a housing connectable to said at least one controller module and said at least one user interface module, said at least one separable wire drive module positionable between a first position and a second position relative to said at least one controller module, each of said separable wire drive modules comprising a feed module therein that includes a plurality of drive rolls for feeding welding wire, the wire drive module connected to and in operative communication with said at least one controller module such that repositioning said housing of said wire drive module between said first position and said second position maintains said at least one gas inlet connector and said at least one welding control cable connector on said at least one controller module on the same plane; and
    at least one wire feeding means for supplying welding wire to said wire drive module, and wherein
    said wire drive module is configurable to feed wire in either the first position or the second position and said at least one separable wire drive module is positionable between said first position and said second position by rotation of said wire drive module about a central vertical axis of said wire drive module which is normal to a wire feed axis.

2. The welding system of claim 1 wherein said wire feeding means is selected from the group consisting of a reel stand for supporting a reel of wire and providing said wire to said wire drive module and a welding wire container providing said wire to said wire drive module.

3. The welding system of claim 1 wherein said at least one controller module further comprises first and second connectors for selectively engaging said wire drive module upon rotation of said wire drive module.

4. The welding system of claim 1 wherein said at least one controller module is at least two controller modules, each of said at least two controller modules comprising
   a housing;
   at least one gas inlet connector connected to said housing; and
   at least one welding control cable connector connected to said housing;
   wherein said at least one user interface module is operatively connected to each of said at least two controller modules;
   wherein said at least one separable wire drive module is at least two separable wire drive modules, each module having one wire drive positionable from a first position to a second position, each of said separable wire drive modules comprising a feed module, the wire drive module connected to and in operative communication with said at least one controller module such that repositioning said wire drive module between said first position and said second position maintains said at least one gas inlet connector and said at least one welding control cable connector on the same plane or surface; and wherein
   each of said wire drive modules is configurable to feed wire in either the first position or the second position.

5. The welding system of claim 4 wherein said wire feeding means is at least two wire reel stands.

6. A modular welding system for use with a wire feeder for left- or right-hand wire feed, comprising:
   a controller module comprising;
      a housing;
      at least one power connector connected at a first end of the housing; and
      a gas inlet connected at the first end of the housing;
   a user interface module having a housing operatively connected to said controller module, said user interface module positioned at a second, opposite end of said housing of said controller module, said user interface module receiving input from a user and sending commands to said controller module based on said input from said user; and
   a separable and repositionable wire drive module having a housing operatively connected to said controller module and said user interface module, said wire drive module further comprising a positionable wire feeder that includes a plurality of drive rolls for feeding a welding wire;
   wherein said wire drive module and drive rolls are positionable relative to said controller module in either a left-handed or right-handed arrangement without repositioning of said user interface module or said controller module and said separable wire drive module is positionable between a first position and a second position by rotation of said wire drive module about a central vertical axis of said wire drive module which is normal to a wire feed axis.

7. The modular welding system of claim 6 wherein said controller module further comprises first and second connectors for selectively engaging said separable wire drive module upon rotation of said wire drive module.

8. The modular welding system of claim 6 wherein said wire drive module further comprises means for detecting if said wire feeder is in a left-hand or right-hand arrangement.

9. The modular welding system of claim 6 wherein said controller module is two controller modules, each comprising at least a power connector and a gas inlet at one end of each of said controller modules;
   said user interface module is operatively connected to each of said two controller modules, said user interface module positioned at an opposed end of said controller module;
   said separable and repositionable wire drive module is two separable and repositionable drive modules, each operatively connected to one controller module, said wire drive module further comprising a positionable wire feeder;
   said drive module using either a left-handed or right-hand wire drive module without repositioning of said user interface module or said controller module.

10. The modular welding system of claim 9 wherein said user interface module includes means for selecting which of said two controller modules to communicate with.

11. A modular welding system which comprises:
    at least one controller module, each of said at least one controller modules comprising
       a housing;
       at least one gas inlet connector connected to said housing; and
       at least one welding control cable connector connected to said housing;
    at least one separable wire drive module having a housing positionable between a first position and a second position relative to said at least one controller module, each of said separable wire drive modules comprising a feed module that includes a plurality of drive rolls for supplying welding wire, the wire drive module connected to and in operative communication with said at least one controller module such that repositioning said wire drive module and drive rolls between said first position and said second position maintains said at least one gas inlet connector and said at least one welding control cable connector on the same plane or surface; and
    at least one wire feeding means for supplying welding wire to said wire drive module, and wherein
    said wire drive module is configurable to feed wire in either the first position or the second position and said at least one separable wire drive module is positionable between said first position and said second position by rotation of said wire drive module about a central vertical axis of said wire drive module which is normal to a wire feed axis.

12. The welding system of claim 11 wherein said wire feeding means is selected from the group consisting of a reel stand for supporting a reel of wire and providing said wire to said wire drive module and a welding wire container providing said wire to said wire drive module.

13. The welding system of claim 11 wherein said at least one controller module further comprises first and second connectors for selectively engaging said at least one separable wire drive module upon rotation of said at least one separable wire drive module.

14. The welding system of claim 11 wherein said at least one controller module is at least two controller modules, each of said at least two controller modules comprising
    a housing;
    at least one gas inlet connector connected to said housing;
    at least one welding control cable connector connected to said housing;
    said at least one separable wire drive module is at least two separable wire drive modules, each module having one wire drive positionable between a first position and a second position, each of said separable wire drive modules comprising a feed module, the wire drive module connected to and in operative communication with said at least one controller module such that repositioning said wire drive module between said first position and said second position maintains said at least one gas inlet connector and said at least one welding control cable connector on the same plane or surface; and wherein each of said wire drive modules is configurable to feed wire in either the first position or the second position.

15. The welding system of claim 14 wherein said wire feeding means is at least two wire reel stands.

16. The welding system of claim 12 wherein said wire feeding means is said reel stand having a spindle repositionable to either side of said reel stand.

* * * * *